(12) United States Patent
Taira et al.

(10) Patent No.: US 7,551,809 B2
(45) Date of Patent: Jun. 23, 2009

(54) OPTICAL FIBER DELIVERY SYSTEM FOR DELIVERING ULTRASHORT OPTICAL PULSES AND OPTICAL SYSTEM INCLUDING THE SAME

(75) Inventors: Kenji Taira, Kodaira (JP); Hirokazu Kubo, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/055,059

(22) Filed: Mar. 25, 2008

(65) Prior Publication Data
US 2008/0260319 A1 Oct. 23, 2008

(30) Foreign Application Priority Data
Apr. 20, 2007 (JP) .............................. 2007-112042

(51) Int. Cl.
*G02F 1/01* (2006.01)
*H01S 3/00* (2006.01)
*H04J 14/02* (2006.01)

(52) U.S. Cl. .................. 385/1; 385/2; 385/36; 385/37; 385/122; 385/123; 398/81; 359/341.1

(58) Field of Classification Search ...................... 385/1, 385/2, 3, 31, 123, 125, 124, 38, 36, 122, 385/37; 398/81; 359/341.1, 337.5
See application file for complete search history.

(56) References Cited

U.S. PATENT DOCUMENTS

| | | | |
|---|---|---|---|
| 5,862,287 A | 1/1999 | Stock et al. .................. 385/123 |
| 6,178,041 B1 | 1/2001 | Simon ......................... 359/368 |
| 6,834,134 B2 * | 12/2004 | Brennan et al. ................ 385/15 |
| 7,072,101 B2 * | 7/2006 | Kapteyn et al. ........... 359/337.5 |
| 7,095,772 B1 * | 8/2006 | Delfyett et al. ........... 372/50.22 |
| 7,483,204 B2 * | 1/2009 | Harter ........................ 359/333 |
| 2008/0130099 A1 * | 6/2008 | Harter ..................... 359/341.1 |

FOREIGN PATENT DOCUMENTS

| | | | |
|---|---|---|---|
| JP | 10-186424 | 7/1998 | ............. 385/123 X |
| JP | 11-218490 | 8/1999 | ............. 385/123 X |

OTHER PUBLICATIONS

Clark, S.W. et al., "Fiber delivery of femtosecond pulses from a Ti:sapphire laser", Optics Letters (2001), vol. 26, No. 17, pp. 1320-1322.

* cited by examiner

*Primary Examiner*—Brian M Healy
(74) *Attorney, Agent, or Firm*—Scully, Scott, Murphy & Presser, P.C.

(57) ABSTRACT

An optical fiber delivery system for delivering ultrashort optical pulses that can efficiently transmit high peak power, ultrashort optical pulses from an optical pulse source to a desired position in an optical apparatus is provided. An optical system including such an optical fiber delivery system is also provided. The optical fiber delivery system includes light waveguide means 20 for receiving high-peak power, ultrashort optical pulses and transmitting the optical pulses, negative group-velocity dispersion generation means 30 for providing negative group-velocity dispersion to the optical pulses transmitted through the light waveguide means 20, and an optical fiber 40 that transmits the optical pulses transmitted through the negative group-velocity dispersion generation means 30 along a desired distance. The incident ultrashort optical pulses that have been injected into the light waveguide means 20 are converted into down-chirped pulses.

14 Claims, 10 Drawing Sheets

OPTICAL FIBER DELIVERY SYSTEM FOR DELIVERING ULTRASHORT OPTICAL PULSES AND OPTICAL SYSTEM INCLUDING THE SAME

BACKGROUND OF THE INVENTION

1. Field of the Invention

The present invention relates to an optical fiber delivery system for delivering ultrashort optical pulses and an optical system including the same.

This application claims priority from Japanese Patent Application No. 2007-112042) filed on Apr. 20, 2007, the content of which is incorporated herein by reference.

2. Description of the Related Art

In recent years, sub-picosecond ultrashort optical pulses, having high peak power and broad spectrum, have been used in various fields, such as biology, medicine, medical care, processing, and measurement. In particular, in the fields of biology and medicine, an optical pulse source that generates ultrashort optical pulses, such as a titanium: sapphire laser and a fiber laser, has been frequently used in a microscope using nonlinear optical effects, such as a multi-photon fluorescence microscope, a harmonic generation microscope, and a coherent anti-Stokes Raman scattering (CARS) microscope; a gene transfer apparatus using optical stress waves; a diffuse optical tomography apparatus and the like.

High-peak power, ultrashort optical pulses emitted from any of such optical pulse sources are transmitted to an optical apparatus, such as any of the microscopes described above, by using a reflective mirror or an optical fiber. From the viewpoints of handling and stability, it is strongly desirable to use an optical fiber to transmit ultrashort optical pulses.

However, the intense ultrashort optical pulses are broadened during the propagation in the optical fiber due to the group-velocity dispersion (GVD) effect, the nonlinear optical effect, such as a self-phase modulation (SPM) effect, and the interaction between them. Such pulse broadening is problematic in many applications.

For example, a nonlinear optical microscope, such as a multi-photon fluorescence microscope, requires high-peak power, ultrashort optical pulses. If the pulse width broadens in an optical fiber) the peak power of each of the optical pulses decreases accordingly, and hence the brightness of a fluorescence obtained by the microscope decreases.

In a multi-photon fluorescence microscope the multi-photon fluorescence intensity $I_n$ and the peak power of optical pulse $P_0$ are expressed by the following formulae (1) and (2), respectively.

$$I_n = C_0 P_0^n T_0 f_{rep} \quad (1)$$

$$P_0 = C_1 \frac{P_{av}}{f_{rep} T_0} \quad (2)$$

In the above formulae (1) and (2), reference character n represents a natural number, which is 2, 3, and k for two-photon fluorescence, three-photon fluorescence, and k-photon fluorescence, respectively. Reference characters $C_0$ and $C_1$ represent constants. Reference character $T_0$ represents the pulse width of the optical pulse. Reference character $f_{rep}$ represents the repetition rate of the optical pulses. Reference character $P_{av}$ represents the average power of the optical pulses. By using the formula (2) to rewrite the formula (1), the multi-photon fluorescence intensity $I_n$ is expressed by the following formula (3).

$$I_n = C \frac{P_{av}^n}{(f_{rep} T_0)^{n-1}} \quad (3)$$

where C represents a constant.

The formula (3) shows that the multi-photon fluorescence intensity $I_n$ decreases as the optical pulse width $T_0$ broadens, while $I_n$ increases as $T_0$ narrows.

There is a report relating to a fiber delivery system of the ultrashort optical pulse which avoids the temporal broadening of the optical pulse [Non-patent Document 1]. The system consists of two optical fibers and a prism pair which is located between the two fibers. The pulse distortion due to the interaction between the GVD and SPM effect can be compensated in this system, and the optical pulse can have the same output temporal width with the input one.

[Non-patent Document 1] S. W. Clark et al., "Fiber delivery of femtosecond pulses from a Ti: sapphire laser," Opt. Lett. 26, 1320 (2001).

Since the system, disclosed in Non-patent Document 1, delivers the optical pulse having the same temporal pulse width between at the input and at the output ends, it makes it possible to efficiently deliver the high-peak power ultrashort optical pulse from the optical pulse source.

However, the optics system, which is included in an optical apparatus such as a microscope using an ultrashort optical pulse, has a positive GVD value, because the optics system employs various kinds of optical elements such as lenses. Therefore, when high-peak power, ultrashort optical pulses are incident on the optical system through the optical fiber delivery system described above, the GVD effect of the optics system in the optical apparatus broadens the pulse width in the optics system, and hence ultrashort optical pulses, each having high peak power and a desired width, cannot be obtained at a desired position.

SUMMARY OF THE INVENTION

Therefore, an object of the present invention, which has been made in view of such circumstances, is to provide an optical fiber delivery system for delivering ultrashort optical pulses that can efficiently transmit high peak power, ultrashort optical pulses from an optical pulse source to a desired position in an optical apparatus, and an optical system including such an optical fiber delivery system.

The first aspect of the invention, which achieves the object described above, is an optical fiber delivery system for delivering ultrashort optical pulses comprising:

light waveguide means for receiving high-peak power, ultrashort optical pulses and transmitting the optical pulses;

negative group-velocity dispersion generation means for providing negative group-velocity dispersion to the optical pulses transmitted through the light waveguide means; and an optical fiber that transmits the optical pulses transmitted trough the negative group-velocity dispersion generation means along a desired distance, wherein the ultrashort optical pulses that have been injected into the light waveguide means are converted into down-chirped pulses.

The second aspect of the invention resides in the optical fiber delivery system for delivering ultrashort optical pulses according to the first aspect,
   wherein the negative group-velocity dispersion generation means converts the incident optical pulses into down-chirped pulses, and
   the optical fiber converts the down-chirped pulses incoming from the negative group-velocity dispersion generation means into down-chirped pulses having a slower rate of the instantaneous frequency change than that of the incident down-chirped pulses.

The third aspect of the invention resides in the optical fiber delivery system for delivering ultrashort optical pulses according to the first aspect,
   wherein the light waveguide means includes any one of a single-mode optical fiber, a multi-mode optical fiber, a photonic crystal fiber, an amplifying optical fiber, a wave guide-type semiconductor optical amplifier, a planar optical waveguide, and a gradient index lens.

The forth aspect of the invention resides in the optical fiber delivery system for delivering ultrashort optical pulses according to the first aspect,
   wherein the light waveguide means has a positive group-velocity dispersion value.

The fifth aspect of the invention resides in the optical fiber delivery system for delivering ultrashort optical pulses according to the first aspect,
   wherein the optical fiber includes any one of a single-mode optical fiber, a multi-mode optical fiber, a photonic crystal fiber, and an amplifying optical fiber.

The sixth aspect of the invention resides in the optical fiber delivery system for delivering ultrashort optical pulses according to the first aspect,
   wherein the optical fiber has a positive group-velocity dispersion value.

The seventh aspect of the invention resides in the optical fiber delivery system for delivering ultrashort optical pulses according to the first aspect
   wherein the ratio of the nonlinearity coefficient to the group-velocity dispersion value of the optical fiber is equal to or greater than that of the light waveguide means.

The eighth aspect of the invention resides in the optical fiber delivery system for delivering ultrashort optical pulses according to the first aspect
   wherein the negative group-velocity dispersion generation means includes any one of a pair of diffraction gratings, a pair of prisms, a chirped fiber Bragg grating a Gires-Tournois (GT) interferometer, a virtually imaged phased array (VIPA)-type dispersion compensator, an arrayed waveguide grating (AWG), a liquid crystal spatial light modulator, a hollow core optical fiber, and a photonic crystal device.

The ninth aspect of the invention resides in the optical fiber delivery system for delivering ultrashort optical pulses according to the first aspect,
   wherein wavelength conversion means for converting the wavelength of the optical pulses transmitted though the optical fiber is provided in downstream of the optical fiber.

The tenth aspect of the invention resides in the optical fiber delivery system for delivering ultrashort optical pulses according to the first aspect,
   wherein positive group-velocity dispersion generation means for providing positive group-velocity dispersion to the optical pulses transmitted through the optical fiber and for transmitting the optical pulses as down-chirped pulses having a slower rate of the instantaneous frequency change than that of the optical pulses is provided in downstream of the optical fiber.

The eleventh aspect of the invention resides in the optical fiber delivery system for delivering ultrashort optical pulses according to the tenth aspect,
   wherein the positive group-velocity dispersion generation means includes any one of a light-transmitting substrates a lens, an acousto-optic modulator, and an electro-optic modulator.

The twelfth aspect of the invention resides in the optical fiber delivery system for delivering ultrashort optical pulses according to the tenth aspect,
   wherein the positive group-velocity dispersion generation means includes an adjustment mechanism that adjusts the amount of positive group-velocity dispersion.

The thirteenth aspect of the invention which achieves the object described above, is an optical system comprising:
   the optical fiber delivery system for delivering ultrashort optical pulses according to the first aspect; and
   an optical apparatus including an optics system having a positive group-velocity dispersion value, the optical apparatus using the optical pulses from the optical fiber delivery system,
   wherein the down-chirped optical pulses from the optical fiber delivery system is incident on the optical apparatus so that high-peak power, ultrashort optical pulses are provided at a desired position in the optics system in the optical apparatus.

The fourteenth aspect of the invention, which achieves the object described above, is an optical system comprising:
   the optical fiber delivery system for delivering ultrashort optical pulses according to the twelfth aspect; and
   an optical apparatus including an optics system having a positive group-velocity dispersion value; the optical apparatus using the optical pulses from the optical fiber delivery system,
   wherein the adjustment mechanism adjusts the amount of positive group-velocity dispersion in the positive group-velocity dispersion generation means in the optical fiber deli very system and the down-chirped optical pulses from the optical fiber delivery system are incident on the optical apparatus so that high-peak power, ultrashort optical pulses are provided at a desired position in the optics system in the optic apparatus.

The fifteenth aspect of the invention, which achieves the object described above, is an optical system comprising:
   the optical fiber delivery system for delivering ultrashort optical pulses according to claim 12;
   an optical apparatus that uses the optical pulses from the optical fiber delivery system; and
   control means for controlling the positive group-velocity dispersion generation means in the optical fiber delivery system and the optical apparatus,
   wherein the optical apparatus includes an optics system having selectable positive group-velocity dispersion values different from each other,
   the adjustment mechanism in the positive group-velocity dispersion generation means includes a plurality of positive group-velocity dispersion elements corresponding to the different positive group-velocity dispersion values in the optics system, and
   the control means controls the adjustment mechanism according to the selected positive group-velocity dispersion value in the optics system to position the corresponding positive group-velocity dispersion element in the light path, and the down-chirped optical pulses from the optical fiber delivery system is incident on the optical apparatus so that high-peak power, ultrashort optical pulses are provided at a desired position in the optics system having the selected positive group-velocity dispersion value.

According to the present invention, since high-peak power, ultrashort optical pulses are transmitted through the light waveguide means, the negative group-velocity dispersion generation means, and the optical fiber, and the ultrashort optical pulses are converted into down-chirped pulses, the optical pulses can be efficiently transmitted to the optical apparatus that uses the optical pulses in such a way that high-peak power, ultrashort optical pulses are provided at a desired position.

DETAILED DESCRIPTION OF THE PREFERRED EMBODIMENTS

Embodiments of the present invention will be described below with reference to the drawings.

First Embodiment

Figure 1:
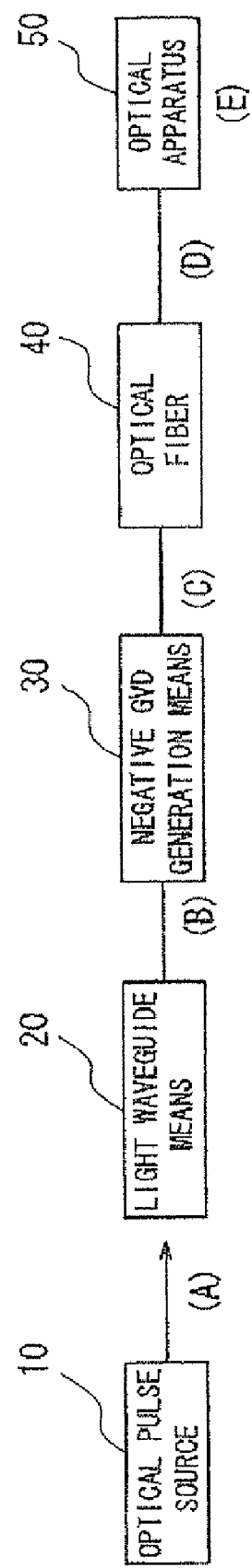
FIG. 1 is a block diagram showing a schematic configuration of an optical system including an optical fiber delivery system for delivering ultrashort optical pulses according to a first embodiment of the present invention.
Figure 2:
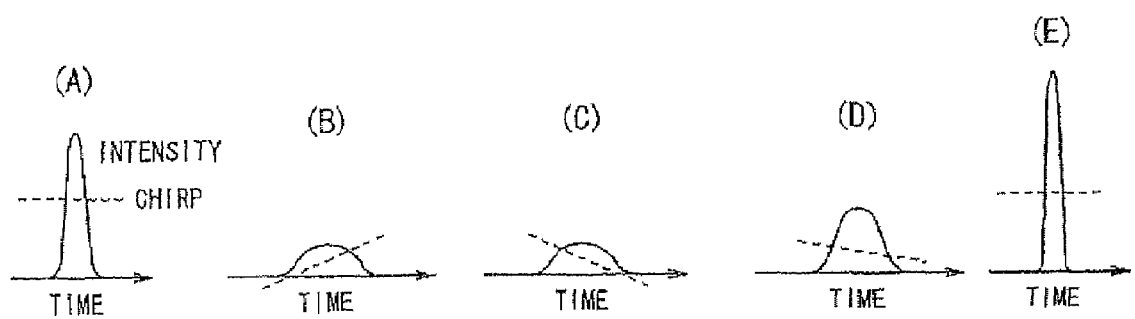
FIGS. 2(A) to 2(E) show temporal profiles of an optical pulse in respective portions in FIG. 1.
Figure 3:
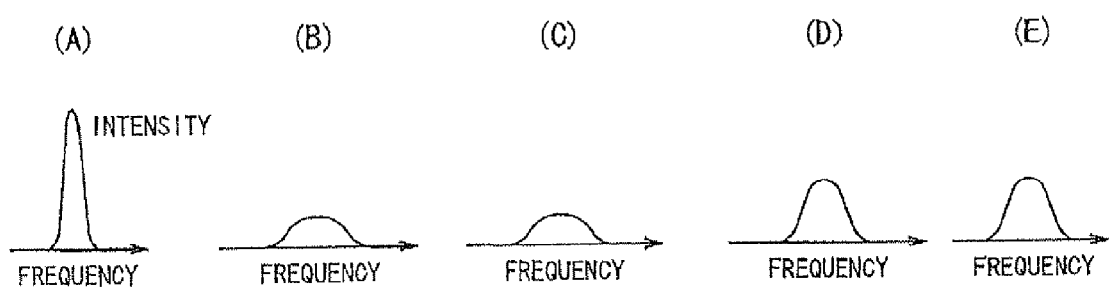
FIGS. 3(A) to 3(E) show spectral profiles of an optical pulse in respective portions in FIG. 1.

FIGS. 1 to 3 show a first embodiment of the present invention. FIG. 1 is a block diagram showing a schematic configuration of an optical system including an optical fiber delivery system for delivering ultrashort optical pulses. FIGS. 2(A) to 2(F) and FIGS. 3(A) to 3( ) show temporal profiles and spectral profiles of an optical pulse in the portions (A) to (E) in FIG. 1, respectively. In FIGS. 2(A) to 2(E), the broken lines indicate a chirp.

The optical system according to the present embodiment includes au optical pulse source 10, light wave guide means 20, negative GVD generation means 30, an optical fiber 40, and an optical apparatus 50 that has a positive GVD value and uses ultrashort optical pulses. The optical pulse source 10 is any one of a titanium: sapphire laser, a mode-locked rare earth doped optical fiber laser, a mode-locked semiconductor laser, and a gain-switched semiconductor laser, or any one of the above lasers combined with an optical amplifier so as to produce ultrashort optical pulses, each having, for example, a pulse width narrower than 100 picoseconds.

The high-peak power, ultrashort optical pulse produced by the optical pulse source 10 is incident on the light waveguide means 20. The light waveguide means 20 is, for example, any one of the following optical components having a positive GVD value at the wavelength of the optical pulses: a Silica-based single-mode optical fiber, a single-mode photonic crystal fiber (PCF), an Yb-doped optical fiber, an Er-doped optical fiber, a multi-mode optical fiber, an amplifying optical fiber, a waveguide-type semiconductor optical amplifier, a planar optical waveguide, and a gradient index lens.

The high-peak power, ultrashort optical pulse from the optical pulse source 10 shown in FIGS. 2(A) and 3(A) passes through the light waveguide means 20, where the interaction between the positive GVD effect and the SPM effect of the light waveguide means 20 broadens the pulse width and the spectral width, so that the optical pulse is converted into an up-chirped (blue-shift chirped) pulse having reduced peak power as shown in FIGS. 2(B) and 3(B)

The up-chirped optical poise that has transmitted through the light waveguide means 20 is then injected into the negative GVD generation means 30. The negative GVD generation means 30 is, for example, any one of the following optical components providing negative GVD at the wavelength of the optical pulses: a pair of diffraction gratings, a pair of prisms, a chirped fiber Bragg grating (CFBG), a Gires-Tournois (GT) interferometer, a virtually imaged phased array (VIPA)-type dispersion compensator, an arrayed waveguide grating (AWG), a liquid crystal spatial light modulator, a hollow core optical fiber, and a photonic crystal device.

The up-chirped pulse from the light waveguide means 20 passes through the negative GVD generation means 30, where the negative GVD effect of the negative GVD generation means 30 converts the up-chirped pulse into a down-chirped (red-shift chirped) pulse as shown FIGS. 2(C) and 3(C). The amount of negative GVD that the negative GVD generation means 30 provides to the optical pulse is adjusted in such a way that the optical pulse is sufficiently recompressed at a desired point in the optical apparatus 50.

The down-chirped optical pulse that has been transmitted through the negative GVD generation means 30 is then injected into the optical fiber 40. The optical fiber 40, which carries the optical pulse along a desired distance, is, for example, any one of the following optical fibers having a positive GVD value at the wavelength of the optical pulse: a Silica-based single-mode optical fiber, a multi-mode optical fiber, a single-mode PCP, and an amplifying optical fiber. The optical power at the input end of the optical fiber 40 is usually smaller than that at the output end of the light waveguide means 20 because of the optical loss. Therefore, the ratio of the nonlinearity coefficient to the GVD value of the optical fiber 40 is often preferably equal to or greater than that of the light waveguide means 20.

The down-chirped pulse from the negative GVD generation means 30 passes through the optical fiber 40, where the interaction between the positive GVD effect and the SPM effect of the optical fiber 40 makes the pulse width and the spectral width narrower, as shown in FIGS. 2(D) and 3(D), than those of the incident pulse as shown in FIGS. 2(C) and 3(C), resulting in a down-chirped pulse also having higher peak power. That is, a down-chirped pulse that has transmitted through the optical fiber 40 has a slower rate of the instantaneous frequency change than that of the down-chirped pulse incident from the negative GVD generation means 30.

The optical pulse that has been transmitted through the optical fiber 40 is finally injected into the optical apparatus 50. The optical apparatus 50 is, for example, a laser-scanning microscope (LSM) or an endoscope for the observation of biological specimen.

Then, the GVD effect of the optics system in the optical apparatus 50 makes the optical pulse width of the down-chirped pulse from the optical fiber 40 even narrower whereas the spectral width remains substantially unchanged as shown in FIGS. 2(E) and 3(F). The optical pulse is recompressed on a biological specimen, which is the desired position, to the same level with that at the input end of the light waveguide means 20 or even shorter, and the peak power of the optical pulse is also high enough. Deep sites in the biological specimen can thus be observed with sufficient brightness.

Figure 4:
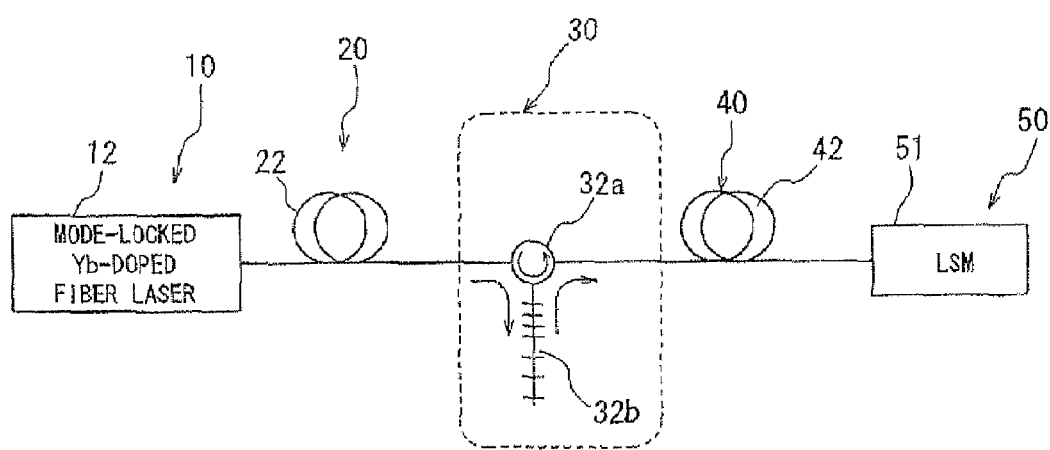
FIG. 4 shows an exemplary specific configuration of the optical system according to the first embodiment.

FIG. 4 shows an exemplary specific configuration of the optical system according to the first embodiment. In the optical system, the optical pulse source 10 is a mode-locked Yb-doped fiber laser 12 that produces ultrashort optical pulses having an operation wavelength of 1060 nm, a pulse width of approximately 500 fs a repetition rate of 20 MHz, and an average optical output power of approximately 200 mW. The light waveguide means 20 is a single-mode optical fiber 22 which has a GVD value of about +25 $ps^2km^{-1}$, a nonlinearity coefficient of about 5 $W^{-1}km^{-1}$ at a wavelength around 1060 nm, and a fiber length of 2 m.

The negative GVD generation means 30 is a CFBG 32b with a circulator 32a. The optical pulses from the single-mode optical fiber 22 are incident on the CFBG 32b through the circulator 32a, and the optical pulses reflected off the CFBG 32b are incident on the optical fiber 40 through the circulator 32a. In this way, approximately −0.096 $ps^2$ of GVD is provided to the optical pulses.

The optical fiber 40 is a single-mode optical fiber 42 which has a GVD value of about +25 $ps^2km^{-1}$, a nonlinearity coefficient of about 5 $W^{-1}km^{-1}$, at wavelength around 1060 nm and a fiber length of 5 m. The optical apparatus 50 is an LSM 51 that provides approximately +0.0050 $ps^2$ of GVD.

The configuration shown in FIG. 4 provides ultrashort optical pulses on the biological specimen in the LSM 51, optical pulse having a wavelength of 1060 nm, an optical pulse width of 200 fs, and a peak power of approximately 20 kW.

Second Embodiment

Figure 5:
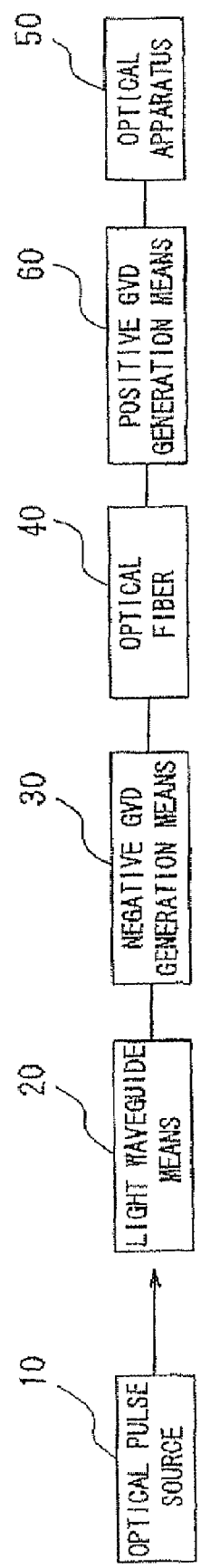
FIG. 5 is a block diagram showing a schematic configuration of an optical system including an optical fiber delivery system for delivering ultrashort optical pulses according to a second embodiment of the present invention.

FIG. 5 is a block diagram showing a schematic configuration of an optical system including an optical fiber delivery system for delivering ultrashort optical pulses according to a second embodiment of the present invention. In the present embodiment, positive GVD generation means 60 that provides a positive GVD is added between the optical fiber 40 and the optical apparatus 50 in the configuration shown in FIG. 1 in order to adjust the degree of the down-chirp of the optical pulses to be incident on the optical apparatus 50. In this way, ultrashort optical pulses) having high peak power and a desired width, are provided at a desired position in the optical apparatus 50. The positive GVD generation means 60 is, for example, an ZnSe substrate, which is a light-transmitting substrate, a collimator lens, an acousto-optic (AO) device, or an electrooptic (EO) device.

Figure 6:
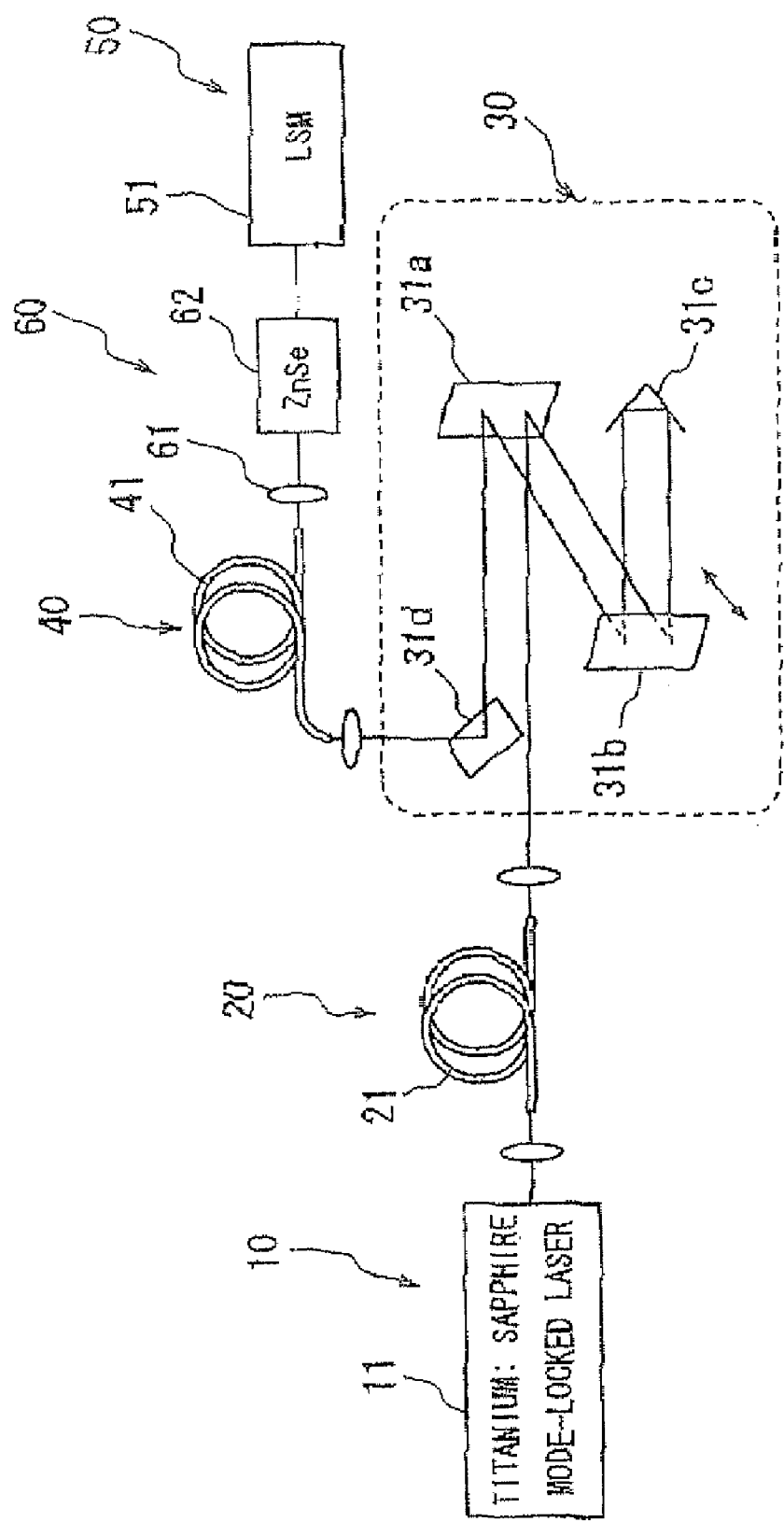
FIG. 6 shows an exemplary specific configuration of the optical system according to the second embodiment.

FIG. 6 shows an exemplary specific configuration of the optical system according to the second embodiment. In the optical system, the optical pulse source 10 is a titanium: sapphire mode-locked laser 11 that produces optical pulses having an operation wavelength range of approximately 700 to 1000 nm, a pulse width of approximately 100 fs, a repetition rate of 80 MHz, and a maximum average optical output power of approximately 3 W. The light waveguide means 20 is a PCF 21 that guides light in the single mode over a wavelength range of approximately 700 to 1000 nm. The PCF 21 bas a GVD value of approximately +20 to +50 $ps^2km^{-1}$, a nonlinearity coefficient of approximately 1.0 to 1.3 $W^{-1}cm^{-1}$, and a length of 1 m.

The negative GVD generation means 30 includes diffraction gratings 31a and 31b, mirrors 31c and 31d, and it is configured in such a way that the incident optical pulses that have been transmitted through the PCF 21 are sequentially diffracted by the diffraction gratings 31a and 31b and then the mirror 31c reverses the light path The reversed optical pulses are transmitted via the diffraction grating 31b, the diffraction grating 31a, and the mirror 31d. In the present embodiment the position of the diffraction grating 31b is adjusted to provide approximately −0.08 to −0.20 $ps^2$ of GVD.

The optical fiber 40 is a PCF 41 that guides light in the single mode over a wavelength range of approximately 700 to 1000 nm. The PCF 41 has a GVD value of approximately +20 to +50 $ps^2km^{-1}$, a nonlinearity coefficient of approximately 1.1 to 1.3 $W^{-1}km^{-1}$, and a length of 3 m. The positive GVD generation means 60 is consists of a collimator lens 61 that provides approximately +0.001 $ps^2$ of GVD and a ZnSe substrate 62 that provides at least +0.0050 $ps^2$ of GVD. The optical apparatus 50 is the LSM 51 that provides approximately +0.0050 $ps^2$ of GVD as in FIG. 4.

The configuration shown in FIG. 6 provides ultrashort optical pulses on the biological specimen in the LSM 51; optical pulse having an optical pulse width of approximately 100 fs in a wavelength range of approximately 700 to 1000 nm.

Third Embodiment

Figure 7:
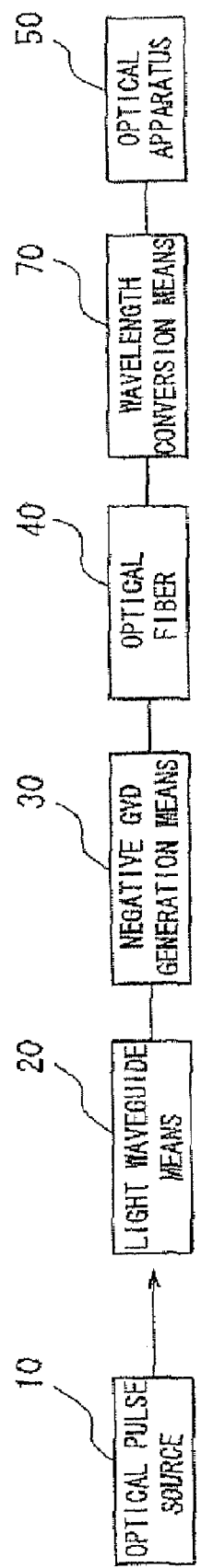
FIG. 7 is a block diagram showing a schematic configuration of an optical system including an optical fiber delivery system for delivering ultrashort optical pulses according to a third embodiment of the present invention.

FIG. 7 is a block diagram showing a schematic configuration of an optical system including an optical fiber delivery system for delivering ultrashort optical pulses according to a third embodiment of the present invention. In the present embodiment, wavelength conversion means 70 is disposed between the optical fiber 40 and the optical apparatus 50 in the configuration shown in FIG. 1, so that the wavelength of the optical pulses is converted into a desired wavelength.

Figure 8:
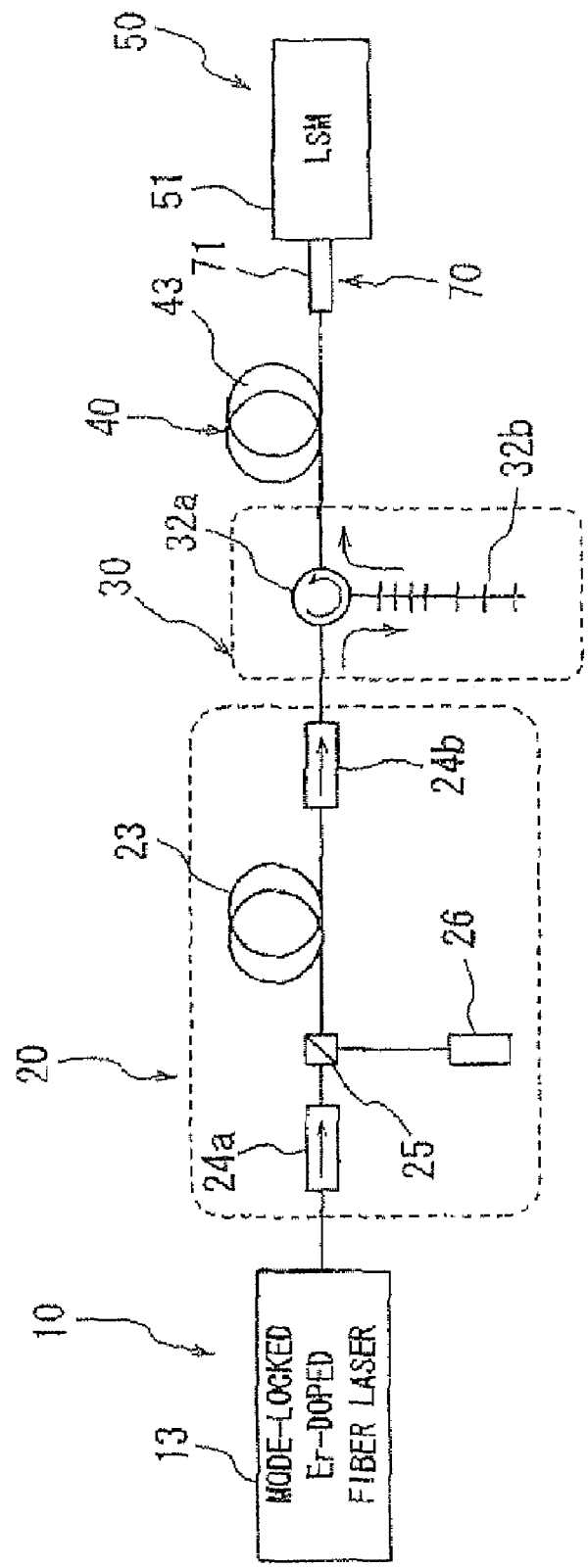
FIG. 8 shows an exemplary specific configuration of the optical system according to the third embodiment.

FIG. 8 shows an exemplary specific configuration of the optical system according to the third embodiment. In the optical system, the optical pulse source 10 is a mode-locked Er-doped fiber laser 13 that produces optical pulses having an operation wavelength of 1550 nm, a pulse width of approximately 500 fs, a repetition rate of 20 MHz, and an average optical output of approximately 10 mW.

The light waveguide means 20 is an optical fiber amplifier. In the optical fiber amplifier, the optical pulses from the mode-locked Er-doped fiber laser 13 are incident on a single-mode Er-doped optical fiber 23 via an isolator 24a and an a pump combiner 25. The pump light at the wavelength of 980 nm or 1480 nm is generated by a semiconductor laser which acts as a pump light source 26, and the pump light is injected into the single-mode Er-doped fiber 23 through the pump combiner 25. Then the optical pulse is amplified in the single-mode Br-doped fiber 23 with the pump light. The isolator 24b is placed at the output of the single-mode Er-doped fiber 23. The single-mode Er-doped optical fiber 23 has a GVD value of approximately +20 $ps^2km^{-1}$, a nonlinearity coefficient of approximately 5 $W^{-1}km^{-1}$ at the wavelength of 1550 nm, and a fiber length of 10 m. In the present embodiment, the average optical output of the optical pulses transmitted through the optical fiber amplifier is set at approximately 200 mW. In FIG. 8, although the optical fiber amplifier is of forward-pumped type in which the pump light is injected into the single-mode Er-doped optical fiber 23 in the forward direction, the optical fiber amplifier may be of backward-pumped type in which the pump light is injected into the optical fiber in the backward direction or of bidirectionally-pumped type in which the pump light is injected into the optical fiber both in the forward and backward directions.

The negative GVD generation means 30 is a combination of the circulator 32a and the CFBG 32b as in FIG. 4. In the present embodiment, the CFBG 32b provides approximately −0.188 ps$^2$ of GVD to the optical pulses.

The optical fiber 40 is a single-mode optical fiber 43 having a GVD value of approximately +130 ps$^2$km$^{-1}$ in the 1550 nm wavelength band, a nonlinearity coefficient of approximately 5 W$^{-1}$km$^{-1}$, and a length of 5 m. The wavelength conversion means 70 is a periodically poled lithium niobate (PPLN) device 71 and uses its second harmonic generation phenomenon to convert the wavelength of the optical pulses from 1550 nm into 775 nm. Further, the optical apparatus 50 is the LSM 51 that provides approximately +0.0050 ps$^2$ of GVD as in FIG. 4.

The configuration shown in FIG. 8 provides ultrashort optical pulses on the biological specimen in the LSM 51, optical pulse having a wavelength of 775 nm, an optical pulse width of approximately 240 fs, and a peak power of approximately 900 w.

Fourth Embodiment

Figure 9:
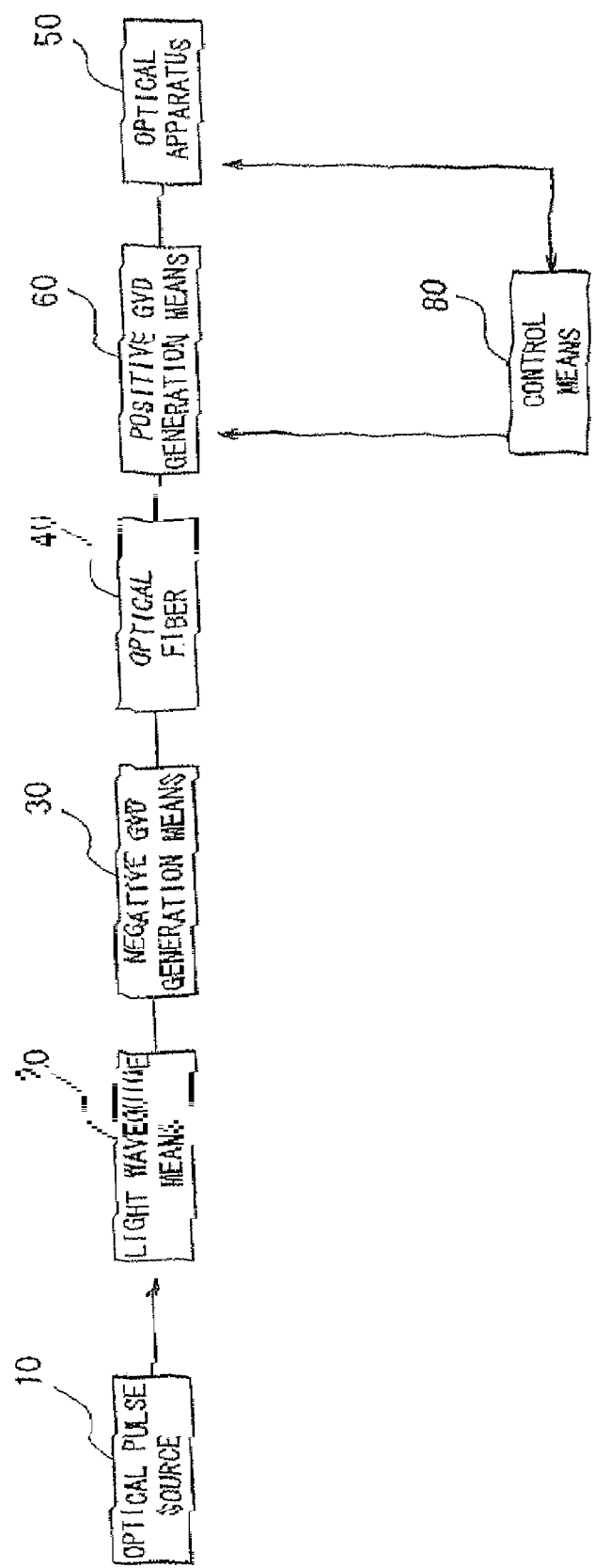
FIG. 9 is a block diagram showing a schematic configuration of an optical system including an optical fiber delivery system for delivering ultrashort optical pulses according to a fob embodiment of the present invention.

FIG. 9 is a block diagram showing a schematic configuration of an optical system including an optical fiber delivery system for delivering ultrashort optical pulses according to a fourth embodiment of the present invention. In the present embodiment, control means 80 is provided in order to control the positive GVD generation means 60 and the optical apparatus 50 in the configuration shown in FIG. 5. The control means 80 controls the amount of GVD provided in the positive GVD generation means 60 according to the change in the amount of GVD in the optical apparatus 50, that is, controlling the degree of down-chirp of the optical pulses to be incident on the optical apparatus 50, so that a desired optical pulse width is provided at a desired position in the optical apparatus 50.

Figure 10:
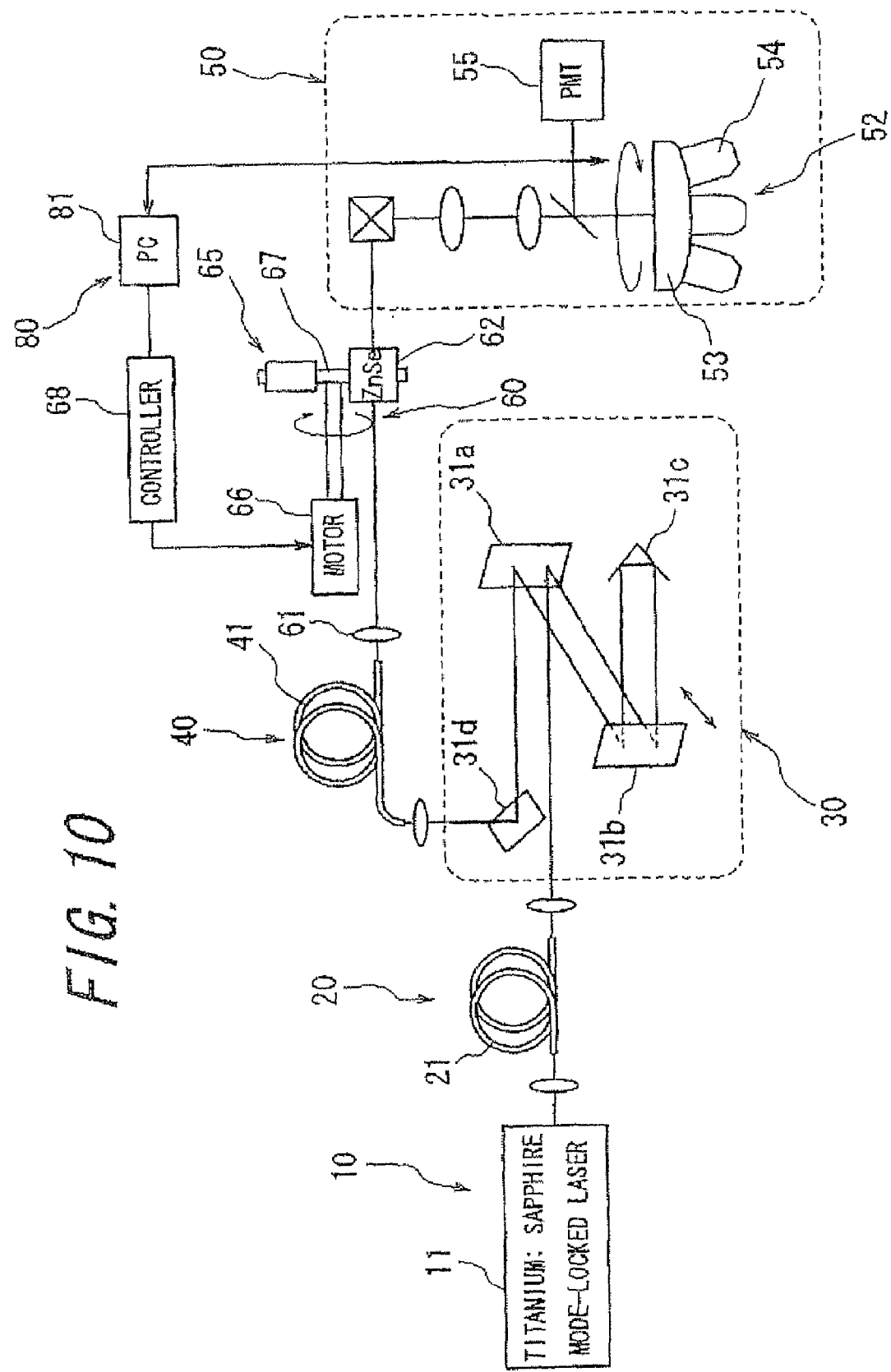
FIG. 10 shows an exemplary specific configuration of the optical system according to the fourth embodiment.

FIG. 10 shows an exemplary specific configuration of the optical system according to the fourth embodiment. In the optical system, the control means 80 is a personal computer (PC) 81. The optical apparatus 50 is an LSM 52 for biological specimen analysis. The LSM 52 includes a plurality of various-magnification objective lenses 54 mounted on a revolver 53. Any of the objective lenses 54 selected through the personal computer 81 or manually selected is inserted in the light path of the optics system. Optical pulses are applied through the selected objective lens 54 onto the biological specimen. The optical pulses excite the biological specimen, and the fluorescence emitted therefrom is incident on a photomultiplier tube (PMT) 55.

The positive GVD value provided in the optics system in the LSM 52 will vary according to the selected objective lens 54. In FIG. 10, the positive CVD generation means 60 includes a collimator lens 61 that provides approximately +0.001 ps$^2$ of GVD and an adjustment mechanism 65 capable of adjusting the amount of GVD. The adjustment mechanism 65 holds a plurality of ZnSe substrates 62 in a removable or exchangeable manner, for example, along a common circumference on a turret 67 rotated by a motor 66, the ZnSe substrates 62 providing different amounts of positive GVD corresponding to the plurality of objective lenses 54 disposed in the LSM 52.

In this way, the computer 81 controls and drives the motor 66 via a controller 68 to position a ZnSe substrate 62 in the light path, the ZnSe substrate 62 having positive GVD corresponding to the selected objective lens 54 in the LSM 52, so as to provide positive GVD that allows ultrashort optical pulses, having a desired pulse width, to be provided on the biological specimen. Since the other portions are the same as those in FIG. 6, the same components as those in FIG. 6 have the same reference numbers and the description thereof will be omitted.

The configuration shown in FIG. 10 provides ultrashort optical pulses having an optical pulse width of approximately 100 fs or shorter in a wavelength range of approximately 700 to 1000 nm on the biological specimen in the LSM 52 without being affected by the switching among the objective lenses 54.

The present invention is not limited only to the above embodiments, and various changes and modifications can be made. For example, the present invention is applicable not only to LSMs for the observation of biological specimen but also to various fields using ultrashort optical pulses, such as endoscopes and optical pulse-based processing apparatuses. Further in the second and fourth embodiments, it is also possible to adjust the positive GVD provided by the positive GVD generation means 60 in correspondence to changes in the optical apparatus 50. Moreover, in any of the above optical fiber delivery systems for transmitting ultrashort optical pulses, it is also possible to dispose a optical amplifier immediately before or after the negative GVD generation means 30 in order to compensate optical loss in the whole delivery system.

What is claimed is:

1. An optical fiber delivery system for delivering ultrashort optical pulses comprising:
   light waveguide means for receiving high-peak power, ultrashort optical pulses and transmitting the optical pulses, the waveguide means having a positive group-velocity dispersion value;
   negative group-velocity dispersion generation means for providing negative group-velocity dispersion to the optical pulses transmitted though the light waveguide means; and
   an optical fiber that transmits the optical pulses transmitted through the negative group-velocity dispersion generation means along a desired distance,
   wherein the ultrashort optical pulses that have been injected into the light waveguide means are converted into down-chirped pulses.

2. The optical fiber delivery system for delivering ultrashort optical pulses according to claim 1,
   wherein the negative group-velocity dispersion generation means converts the incident optical pulses into down-chirped pulses, and
   the optical fiber converts the down-chirped pulses incoming from the negative group-velocity dispersion generation means into down-chirped pulses having a slower rate of the instantaneous frequency change than that of the incident down-chirped pulses.

3. The optical fiber delivery system for delivering ultrashort optical pulses according to claim 1, wherein the light waveguide means includes any one of a single-mode optical fiber, a multi-mode optical fiber, a photonic crystal fiber, an amplifying optical fiber, a waveguide-type semiconductor optical amplifier, a planar optical waveguide, and a gradient index lens.

4. The optical fiber delivery system for delivering ultrashort optical pulses according to claim 1, wherein the optical fiber includes any one of a single-mode optical fiber, a multi-mode optical fiber, a photonic crystal fiber, and an amplifying optical fiber.

5. The optical fiber delivery system for delivering ultrashort optical pulses according to claim 1, wherein the optical fiber has a positive group-velocity dispersion value.

6. The optical fiber delivery system for delivering ultrashort optical pulses according to claim 1, wherein the ratio of the nonlinearity coefficient to the group-velocity dispersion value of the optical fiber is equal to or greater than that of the light waveguide means.

7. The optical fiber delivery system for delivering ultrashort optical pulses according to claim 1, wherein the negative group-velocity dispersion generation means includes any one of a pair of diffraction gratings, a pair of prisms, a chirped fiber Bragg grating, a Gires-Toumois (GT) interferometer, a virtually imaged phased array (VIPA)-type dispersion compensator, an arrayed waveguide grating (AWG), a liquid crystal spatial light modulator, a hollow core optical fiber, and a photonic crystal device.

8. The optical fiber delivery system for delivering ultrashort optical pulses according to claim 1, wherein wavelength conversion means for converting the wavelength of the optical pulses transmitted though the optical fiber is provided in downstream of the optical fiber.

9. The optical fiber delivery system for delivering ultrashort optical pulses according to claim 1, wherein positive group-velocity dispersion generation means for providing positive group-velocity dispersion to the optical pulses transmitted through the optical fiber and for transmitting the optical pulses as down-chirped pulses having a slower rate of the instantaneous frequency change than that of the optical pulses is provided in downstream of the optical fiber.

10. The optical fiber delivery system for delivering ultrashort optical pulses according to claim 9, wherein the positive group-velocity dispersion generation means includes any one of a light-transmitting substrate, a lens, an acousto-optic modulator, and an electro-optic modulator.

11. The optical fiber delivery system for delivering ultrashort optical pulses according to claim 9, wherein the positive group-velocity dispersion generation means includes an adjustment mechanism that adjusts the amount of positive group-velocity dispersion.

12. An optical system comprising:
the optical fiber delivery system for delivering ultrashort optical pulses according to claim 1; and
an optical apparatus including an optics system having a positive group-velocity dispersion value, the optical apparatus using the optical pulses from the optical fiber delivery system,
wherein the down-chirped optical pulses from the optical fiber delivery system are incident on the optical apparatus so that high-peak power, ultrashort optical pulses are provided at a desired position in the optics system in the optical apparatus.

13. An optical system comprising:
the optical fiber delivery system for delivering ultrashort optical pulses according to claim 11; and
an optical apparatus including an optics system having a positive group-velocity dispersion value, the optical apparatus using the optical pulses from the optical fiber delivery system,
wherein the adjustment mechanism adjusts the amount of positive group-velocity dispersion in the positive group-velocity dispersion generation means in the optical fiber delivery system, and the down-chirped optical pulses from the optical fiber delivery system are incident on the optical apparatus so that high-peak power, ultrashort optical pulses are provided at a desired position in the optics system in the optical apparatus.

14. An optical system comprising:
the optical fiber delivery system for delivering ultrashort optical pulses according to claim 11;
an optical apparatus that uses the optical pulses from the optical fiber delivery system; and
control means for controlling the positive group-velocity dispersion generation means in the optical fiber delivery system and the optical apparatus,
wherein the optical apparatus includes an optics system having selectable positive group-velocity dispersion values different from each other,
the adjustment mechanism in the positive group-velocity dispersion generation means includes a plurality of positive group-velocity dispersion elements corresponding to the different positive group-velocity dispersion values in the optics system, and
the control means controls the adjustment mechanism according to the selected positive group-velocity dispersion value in the optics system to position the corresponding positive group-velocity dispersion element in the light path, and the down-chimed optical pulses from the optical fiber delivery system are incident on the optical apparatus so that high-peak power, ultrashort optical pulses are provided at a desired position in the optics system having the selected positive group-velocity dispersion value.

* * * * *